(12) United States Patent
Chen et al.

(10) Patent No.: US 7,701,190 B2
(45) Date of Patent: Apr. 20, 2010

(54) CONTROL CIRCUIT AND METHOD FOR A DC-TO-DC CONVERTER TO IMPROVE TRANSIENT RESPONSE THEREOF

(75) Inventors: Jiun-Chiang Chen, Tantz Township, Taichung County (TW); Liang-Pin Tai, Tainan (TW)

(73) Assignee: Richtek Technology Corp., Hsinchu (TW)

( * ) Notice: Subject to any disclaimer, the term of this patent is extended or adjusted under 35 U.S.C. 154(b) by 79 days.

(21) Appl. No.: 11/657,003

(22) Filed: Jan. 24, 2007

(65) Prior Publication Data
US 2007/0176581 A1 Aug. 2, 2007

(30) Foreign Application Priority Data
Jan. 27, 2006 (TW) .............................. 95103610 A (51) Int. Cl.
*G05F 1/00* (2006.01)
(52) U.S. Cl. ...................... 323/288; 323/283; 323/284
(58) Field of Classification Search ................. 323/272, 323/282–287, 289, 290, 222, 235, 237, 288; 363/48, 53, 56, 71, 81, 89, 97, 127; 327/536
See application file for complete search history.

(56) References Cited

U.S. PATENT DOCUMENTS

| | | | | |
|---|---|---|---|---|
| 5,638,260 A * | 6/1997 | Bees | ........................... | 363/17 |
| 6,140,808 A * | 10/2000 | Massie | ........................ | 323/284 |
| 6,495,995 B2 * | 12/2002 | Groom et al. | ................ | 323/283 |
| 6,825,642 B2 * | 11/2004 | Brooks | ........................ | 323/272 |
| 6,873,140 B2 * | 3/2005 | Saggini et al. | .............. | 323/283 |
| 6,995,548 B2 * | 2/2006 | Walters et al. | .............. | 323/272 |
| 7,208,921 B2 * | 4/2007 | Walters | ........................ | 323/222 |
| 7,233,134 B2 * | 6/2007 | Huang et al. | ................. | 323/284 |
| 2004/0232900 A1 * | 11/2004 | Huang et al. | ................. | 323/282 |
| 2005/0237037 A1 * | 10/2005 | Xing | ........................... | 323/268 |
| 2007/0001655 A1 * | 1/2007 | Schiff | ........................... | 323/246 |

* cited by examiner

*Primary Examiner*—Jessica Han
*Assistant Examiner*—Emily Pham
(74) *Attorney, Agent, or Firm*—Rosenberg, Klein & Lee (57) ABSTRACT

For a DC-to-DC converter including a plurality of channels for converting an input voltage to an output voltage, a control circuit comprises a load transient detector to detect the output voltage to provide a quick response signal. In a load transient, the quick response signal triggers a quick transient response period to increase the operational frequency of the converter.

8 Claims, 13 Drawing Sheets

CONTROL CIRCUIT AND METHOD FOR A DC-TO-DC CONVERTER TO IMPROVE TRANSIENT RESPONSE THEREOF

FIELD OF THE INVENTION

The present invention generally relates to a DC-to-DC converter, and more particularly, to a control circuit and method for a DC-to-DC converter to improve transient response thereof.

BACKGROUND OF THE INVENTION

Figure 1:
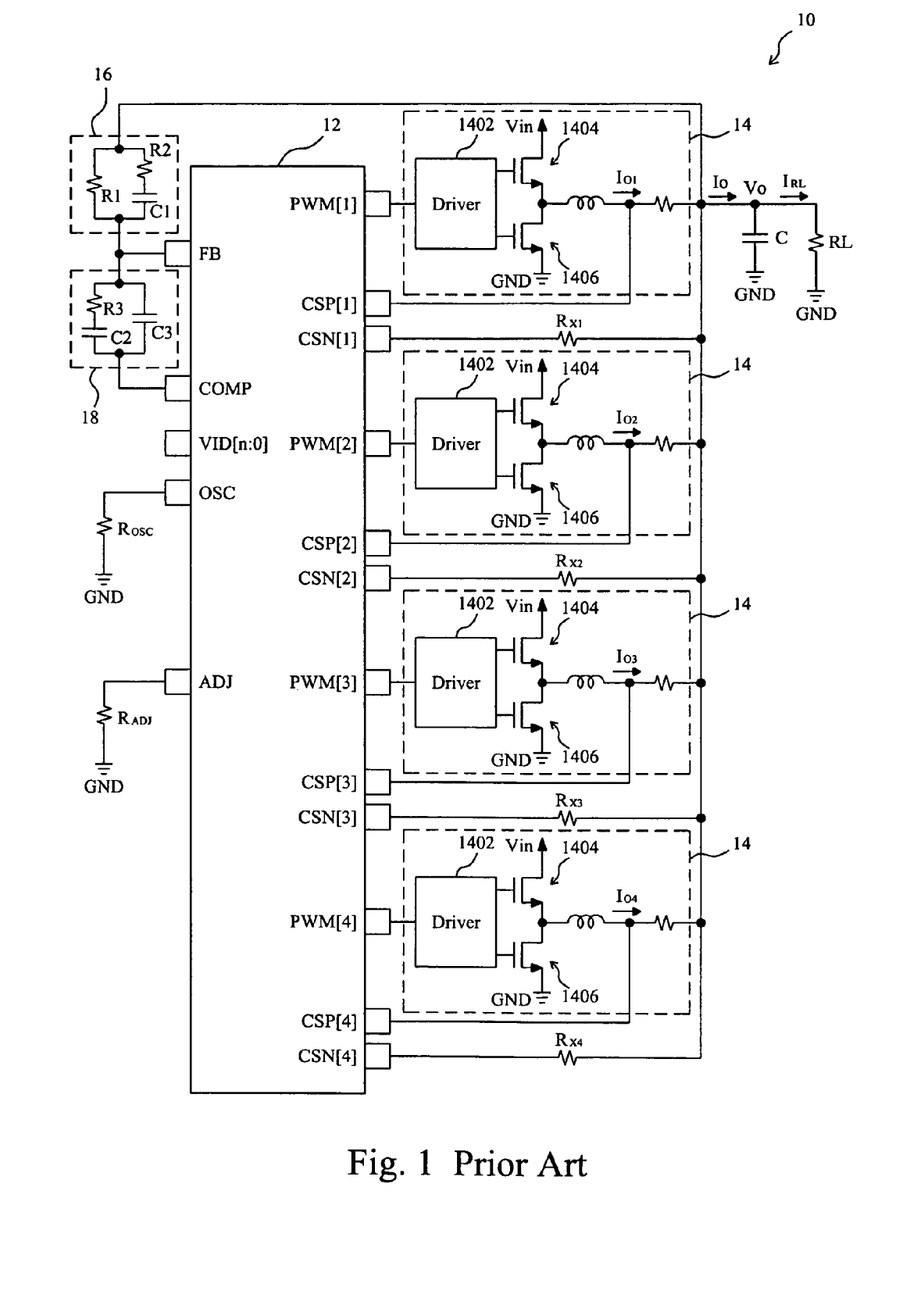
FIG. 1 shows a traditional DC-to-DC converter.

FIG. 1 shows a traditional DC-to-DC converter 10 which comprises a control circuit 12 and four channels 14. Each channel 14 comprises transistors 1404 and 1406 connected in series between the input Vin and ground GND and a driver 1402 in response to the pulse width modulation signals PWM[1] to PWM[4] from the control circuit 12 to switch transistors 1404 and 1406 to regulate channel currents $Io_1$ to $Io_4$. The channel currents $Io_1$ to $Io_4$ are combined to be an output current Io for charging a capacitor C to generate an output voltage Vo. The control circuit 12 detects the channel currents $Io_1$ to $Io_4$ and output voltage Vo for modulating duty cycle of the transistors 1404 and 1406 in the channels 14.

Figure 2:
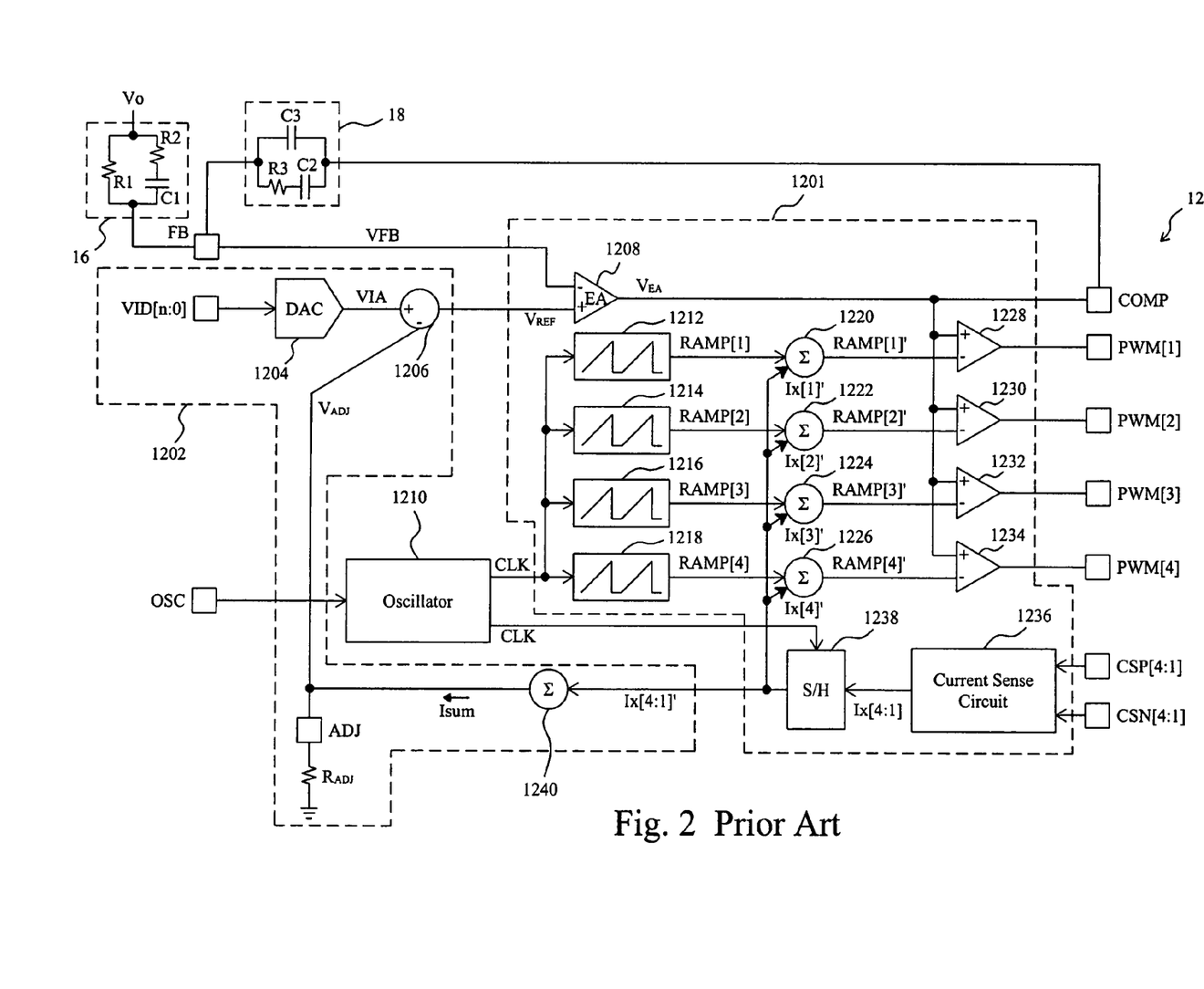
FIG. 2 shows a conventional control circuit for the converter of FIG. 1.

FIG. 2 shows a traditional control circuit 12. A current sense circuit 1236 in a pulse width modulator 1201 senses the channel currents $Io_1$ to $Io_4$ to generate current sense signals Ix[1] to Ix[4] for sample and hold circuit 1238 to generate current sense signals Ix[1]' to Ix[4]'. An adder 1240 in a voltage generator 1202 combines the current sense signals Ix[1]' to Ix[4]' to produce a summing current signal Isum. Since the output current Io is the summation of the channel currents $Io_1$ to $Io_4$ and the current sense signals Ix[1]' to Ix[4]' are proportional to the channel currents $Io_1$ to $Io_4$, respectively, therefore the summing current signal Isum is proportional to the output current Io. The summing current signal Isum flows through a pin ADJ to a resistor $R_{ADJ}$ so as to produce a voltage $V_{ADJ}$ which is thereby proportional to the output current Io. A digital-to-analog converter (DAC) converts a digital voltage VID[n:0] to an analog voltage VIA. A subtracter 1206 subtracts the voltage $V_{ADJ}$ from the analogy voltage VIA to produce a reference voltage $V_{REF}$. An error amplifier 1208 in the pulse width modulator 1201 provides an error signal $V_{EA}$ to a pin COMP in response to the feedback voltage VFB from a pin FB, which represents the output voltage Vo, and the reference voltage $V_{REF}$. ARC network 16 is connected between the output Vo and the pin FB, and a compensation network 18 is connected between the pins COMP and FB. The ramp generators 1212, 1214, 1216, and 1218 generate ramp signals RAMP[1], RAMP[2], RAMP[3], and RAMP[4], respectively, in response to a clock CLK provided by an oscillator 1210. An adder 1220 uses the current sense signal Ix[1]' to shift the level of the ramp signal RAMP[1] to generate a ramp signal RAMP[1]'. A comparator 1228 compares the error signal $V_{EA}$ with the ramp signal RAMP[1]' to generate a pulse width modulation signal PWM[1]. An adder 1222 uses the current sense signal Ix[2]' to shift the level of the ramp signal RAMP[2] to generate a ramp signal RAMP[2]', and a comparator 1230 compares the error signal $V_{EA}$ with the ramp signal RAMP[2]' to generate a pulse width modulation signal PWM[2]. An adder 1224 uses the current sense signal Ix[3]' to shift the level of the ramp signal RAMP[3] to generate a ramp signal RAMP[3]', and a comparator 1232 compares the error signal $V_{EA}$ with the ramp signal RAMP[3]' to generate a pulse width modulation signal PWM[3]. An adder 1226 uses the current sense signal Ix[4]' to shift the level of the ramp signal RAMP[4] to generate a ramp signal RAMP[4]', and a comparator 1234 compares the error signal $V_{EA}$ with the ramp signal RAMP[4]' to generate a pulse width modulation signal PWM[4].

Figure 3:
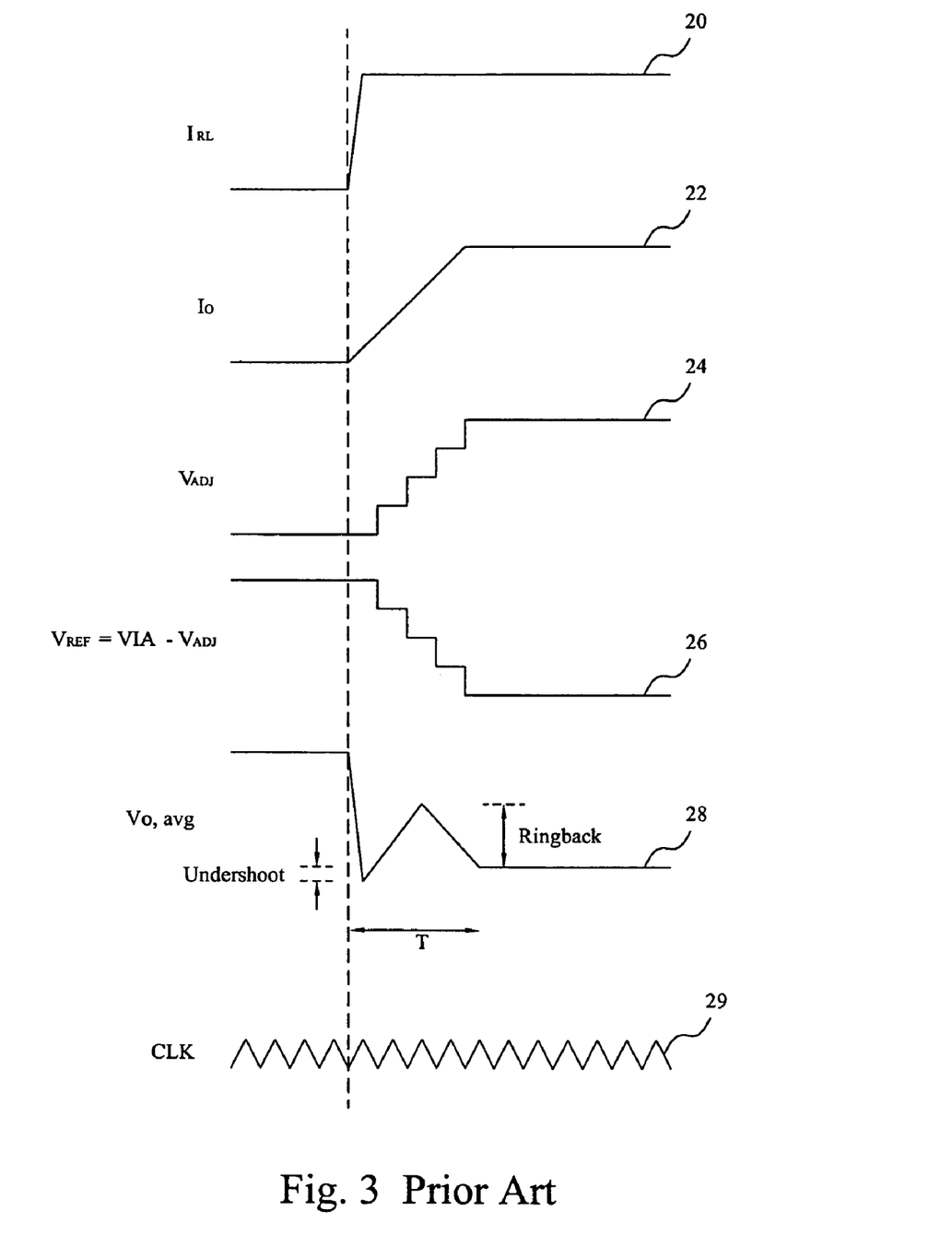
FIG. 3 is a waveform diagram of various signals in the control circuit of FIG. 2.
Figure 4:
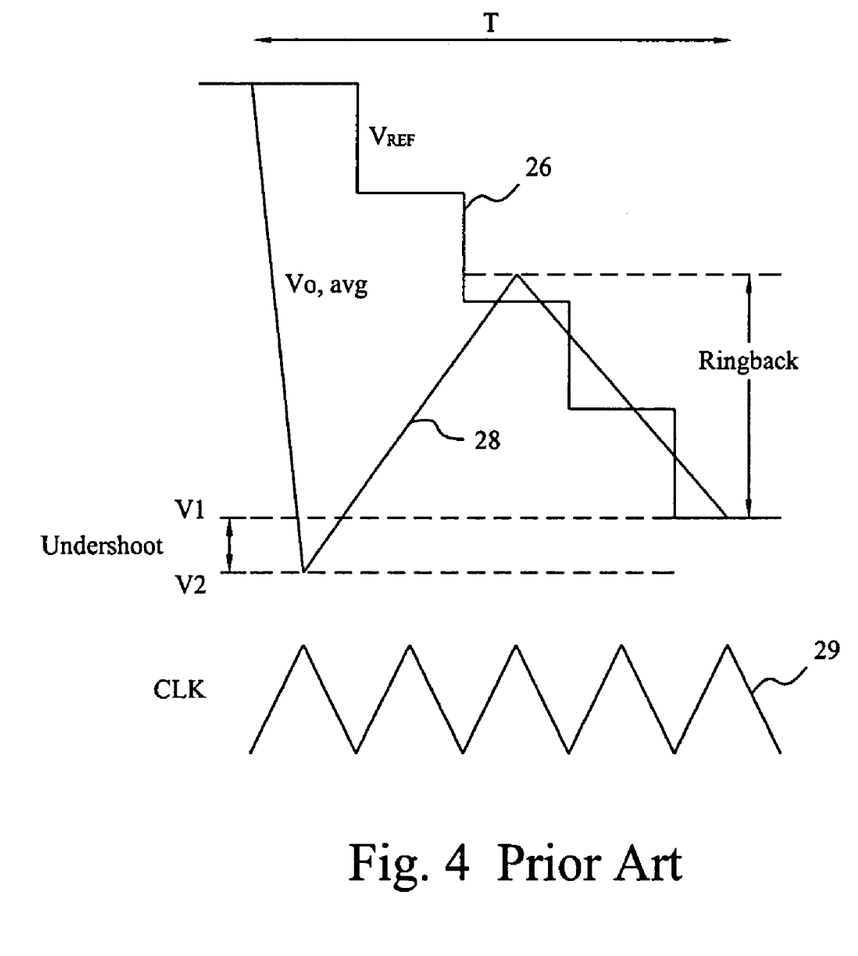
FIG. 4 shows the waveforms of the reference voltage $V_{REF}$ and the feedback voltage VFB.

FIG. 3 is a waveform diagram to show several signals of the DC to DC converter 10 in a load transient, in which waveform 20 represents the load current $I_{RL}$ flowing through the load RL, waveform 22 represents the output current Io, waveform 24 represents the voltage $V_{ADJ}$, waveform 26 represents the reference voltage $V_{REF}$, waveform 28 represents the DC value Vo,avg of the output voltage Vo, and waveform 29 represents the clock CLK. In DC condition, the impedance device 18 in the DC-to-DC converter 10 is open circuit, and the voltage Vo equals to the feedback voltage VFB. Hence the waveform 26 of the reference voltage $V_{REF}$ and the waveform 28 of the voltage Vo,avg are shown together in FIG. 4. Referring to FIGS. 1 to 4, in the load transient of from light loading to heavy loading, the current $I_{RL}$ which flows through the load RL rises up quickly, as shown by the waveform 20, and the voltage Vo,avg drops down quickly as shown by the waveform 28. However, the output current Io can't rise up as fast as the current $I_{RL}$, whose rising speed is slower, as shown by the waveform 22. Since the voltage $V_{ADJ}$ is proportional to the output current Io, the voltage $V_{ADJ}$ rises up slowly as the output current Io. Due to the reference voltage $V_{REF}$ equal to (VIA–$V_{ADJ}$), the falling speed of the reference voltage $V_{REF}$ is slower than the voltage Vo,avg, as shown in FIG. 4. Since the falling speed of the voltage Vo,avg is faster than the reference voltage $V_{REF}$ in load transient, and the feedback voltage VFB will always trace to the reference voltage $V_{REF}$ in the DC-to-DC converter 10, and when the converter 10 reaches stable, the voltage Vo,avg will be equal to the feedback voltage VFB, therefore the voltage Vo,avg will also follow the reference voltage $V_{REF}$. When the voltage Vo,avg drops to the predetermined value V1, the reference voltage $V_{REF}$ does not reach the value V1 yet, as shown in FIG. 4, and therefore the voltage Vo,avg will rise to follow the reference voltage $V_{REF}$. After the voltage Vo,avg reaches the reference voltage $V_{REF}$, it will drop slower to level V1 as the decreasing reference voltage $V_{REF}$. As a result, a ringback is produced. The ringback will affect the performance of the load circuit, which is connected to the output Vo of the DC-to-DC converter 10, for example CPU. In addition, during the load transient period T, since the falling speed of the voltage Vo,avg is faster, it could result in undershoot. In other words, the voltage Vo,avg maybe drop to a value V2 which is lower than the predetermine value V1, as shown in FIG. 4. It also affects the performance of the load circuit.

Therefore, it is desired a control circuit for improving the ringback and undershoot of a DC-to-DC converter during the load transient.

SUMMARY OF THE INVENTION

An object of the present invention is to provide a control circuit and method for improving load transient of a DC-to-DC converter.

A control circuit for a DC-to-DC converter, according to the present invention, comprises a load transient detector to detect an output voltage of the converter to trigger a quick transient response during a load transient. During the quick transient response period, the operation frequency of the converter will increase for improving the load transient.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAIL DESCRIPTION OF THE INVENTION

Figure 5:
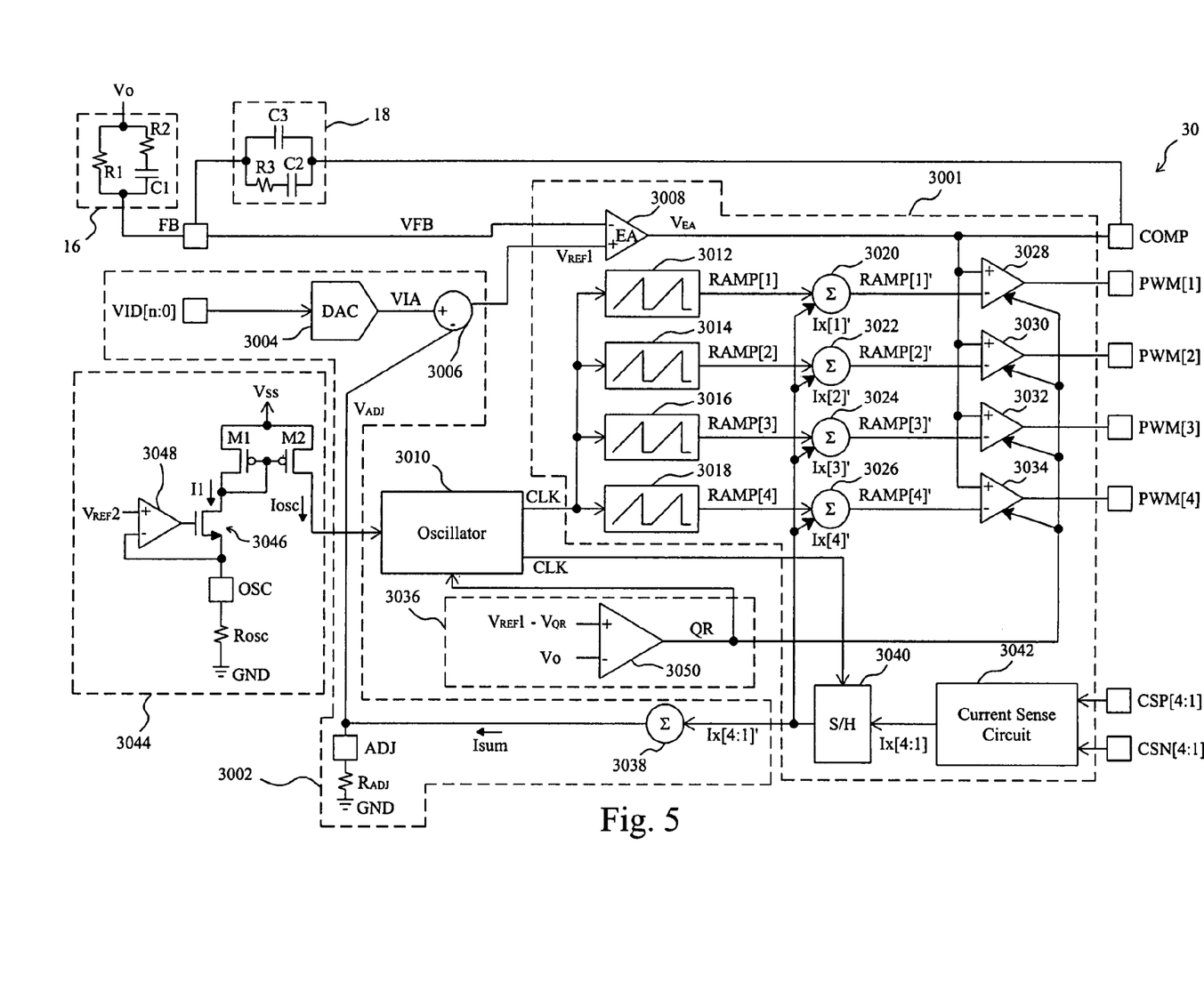
FIG. 5 shows a first embodiment of the present invention.

FIG. 5 shows a first embodiment of the present invention. Referring to FIGS. 1 and 5, the control circuit 30 of FIG. 5 replaces the control circuit 12 of FIG. 1. The control circuit 30 comprises a load transient detector 3036 and a current source 3044 which are connected to an oscillator 3010. In a pulse width modulation circuit 3001, a current sense circuit 3042 senses the current $I_{O1}$ to $I_{O4}$ of the four channels 14 to generate four current sense signals $I_x[1]$ to $I_x[4]$. A sample and hold circuit 3040 samples and holds the current sense signals $I_x[1]$ to $I_x[4]$ in response to the clock CLK provided by the oscillator 3010 to generate current sense signals $I_x[1]'$ to $I_x[4]'$. In a voltage generator 3002, an adder 3038 combines the current sense signals $I_x[1]'$ to $I_x[4]'$ to generate a summing current signal Isum. Since the output current Io is the sum of the four channel currents $I_{O1}$ to $I_{O4}$ and the current sense signals $I_x[1]'$ to $I_x[4]'$ are proportional to the four channel currents $I_{O1}$ to $I_{O4}$, respectively, the summing current signal Isum is proportional to the output current Io. A voltage $V_{ADJ}$ is provided when the summing current signal Isum flows through a resistor $R_{ADJ}$. A digital-to-analog converter 3004 transforms a digital voltage VID [n:0] to an analog voltage VIA, and a subtracter 3006 subtracts the voltage $V_{ADJ}$ from the analog voltage VIA to generate a reference voltage $V_{REF}1$. An error amplifier 3008 of the pulse width modulation circuit 3001 provides an error signal $V_{EA}$ to a pin COMP in response to the feedback voltage VFB from a pin FB, which represents the output voltage Vo, and the reference voltage $V_{REF}1$. An RC network 16 is connected between the output Vo and the pin FB, and a compensation network 18 is connected between the pins COMP and FB. The load transient detector 3036 comprises a comparator 3050 which has an inverting input connected with output voltage Vo and a non-inverting input connected with a voltage ($V_{REF}1-V_{QR}$). The voltage $V_{QR}$ has a predetermined value. For DC situation, the impedance device 18 becomes open circuit, and therefore the output voltage Vo equals the feedback voltage VFB. The comparator 3050 compares the voltages on its inputs to generate a quick response signal QR for the oscillator 3010 and comparators 3028, 3030, 3032, and 3034. The current source 3044 comprises a transistor 3046 connected between the oscillator 3010 and a resistor Rosc, and an operational amplifier 3048 having a non-inverting input connected with a reference voltage $V_{REF}2$, an inverting input connected to the transistor 3046 and resistor Rosc, and an output connected to the gate of the transistor 3046. The voltage across the resistor Rosc is locked to the reference voltage $V_{REF}2$ by the operational amplifier 3048 for generating a constant current I1. A current mirror composed of transistors M1 and M2 mirrors the current I1 to generate a current Iosc for the oscillator 3010. The oscillator 3010 provides a clock CLK in response to the current Iosc and the quick response signal QR. Four ramp generators 3012, 3014, 3016, and 3018 produce four ramp signals RAMP[1], RAMP[2], RAMP[3], and RAMP[4] in response to clock CLK, respectively. An adder 3020 shifts the level of the ramp signal RAMP[1] with the current sense signal $I_x[1]'$ to generate a ramp signal RAMP[1]', and a comparator 3028 compares the error signal $V_{EA}$ with the ramp signal RAMP[1]' to generate the pulse width modulation signal PWM[1]. An adder 3022 shifts the level of the ramp signal RAMP[2] with the current sense signal $I_x[2]'$ to generate a ramp signal RAMP[2]', and a comparator 3030 compares the error signal $V_{EA}$ with the ramp signal RAMP[2]' to generate the pulse width modulation signal PWM[2]. An adder 3024 shifts the level of the ramp signal RAMP[3] with the current sense signal $I_x[3]'$ to generate a ramp signal RAMP[3]', and a comparator 3032 compares the error signal $V_{EA}$ with the ramp signal RAMP[3]' to generate the pulse width modulation signal PWM[3]. An adder 3026 shifts the level of the ramp signal RAMP[4] with the current sense signal $I_x[4]'$ to generate a ramp signal RAMP[4]', and a comparator 3034 compares the error signal $V_{EA}$ with the ramp signal RAMP[4]' to generate the pulse width modulation signal PWM[4].

Figure 6:
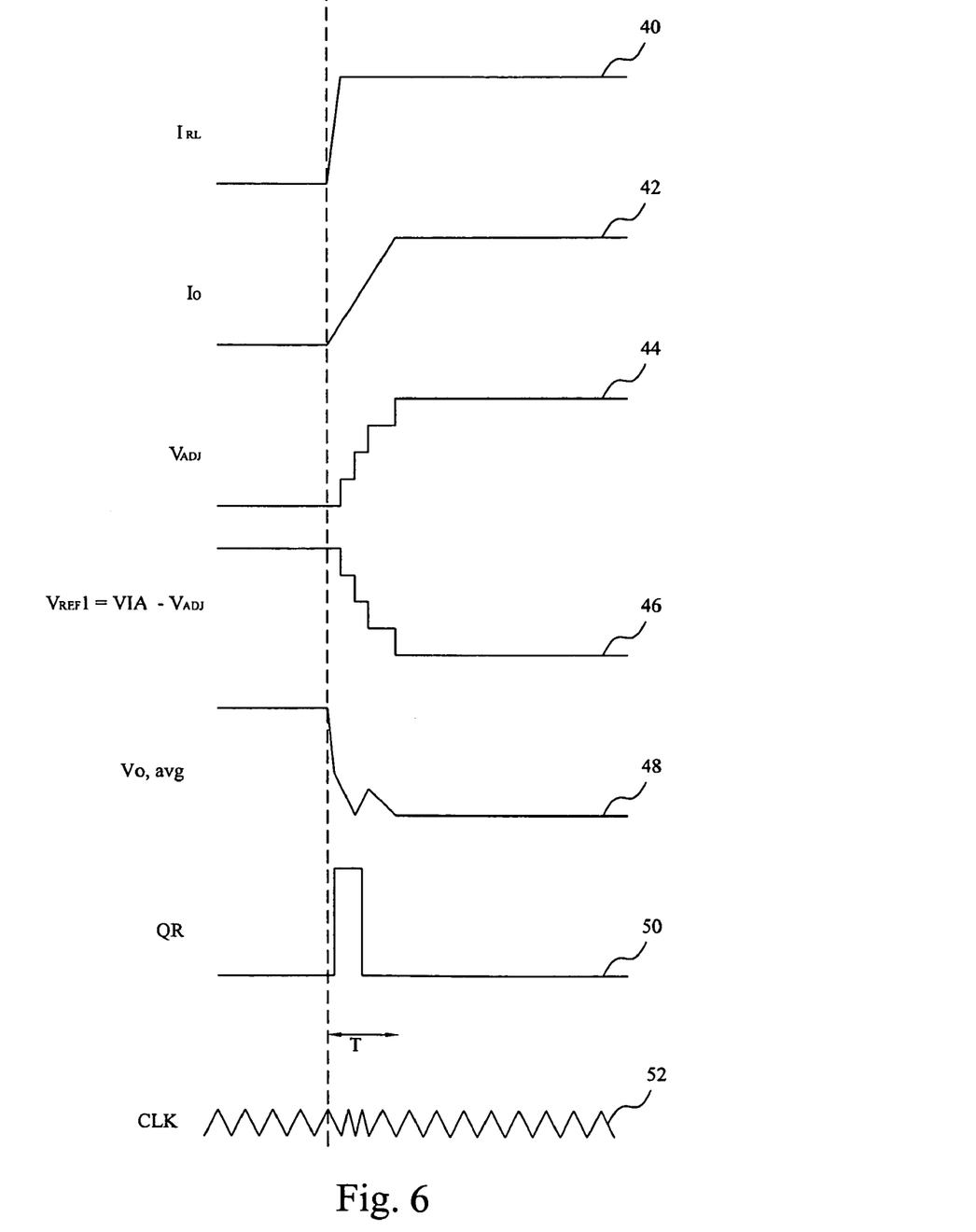
FIG. 6 is a waveform diagram of various signals during a load transient of the first embodiment.
Figure 7:
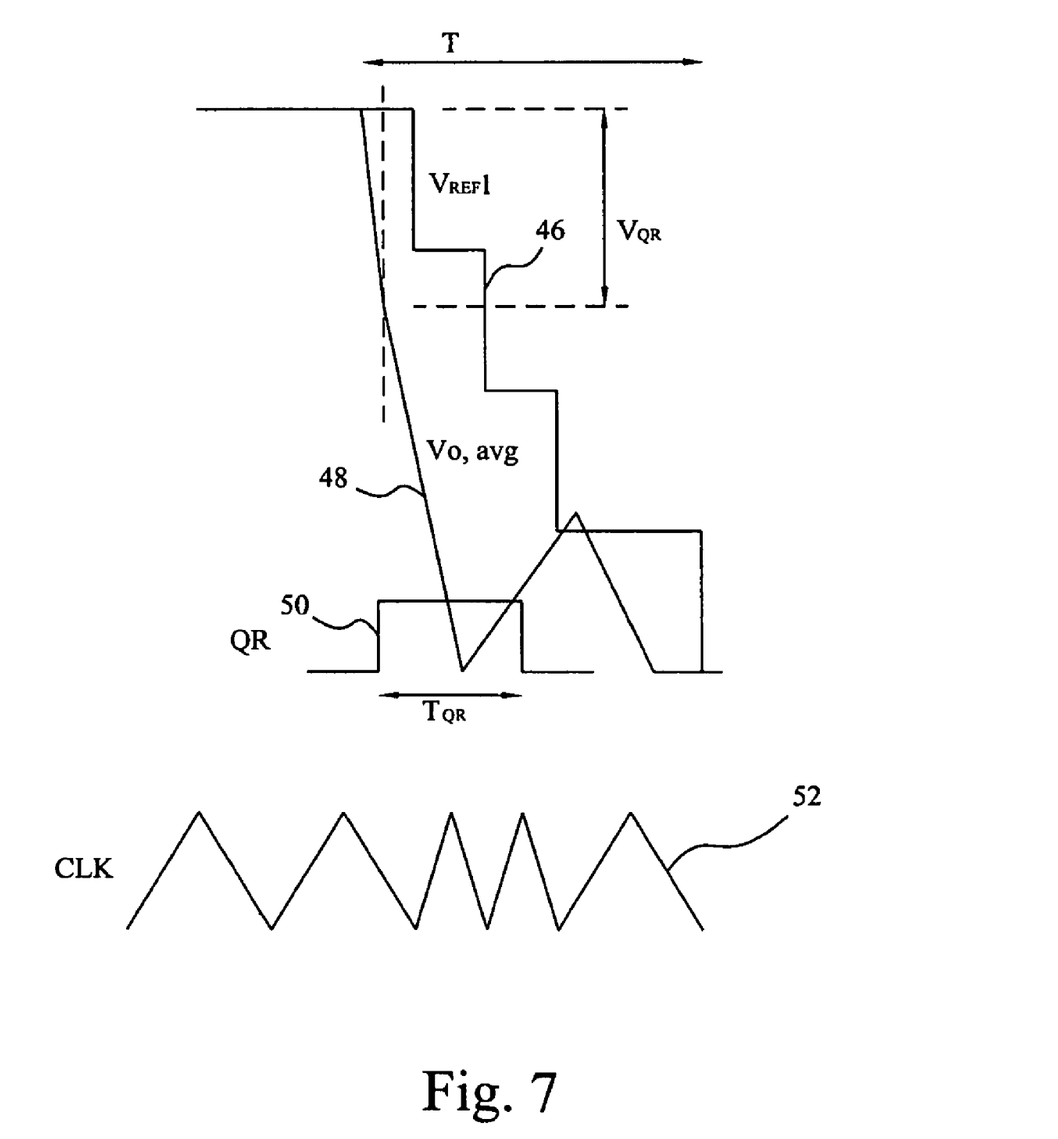
FIG. 7 shows waveform of the reference voltage $V_{REF}1$, the feedback voltage VFB, and the quick response signal QR of FIG. 6.

FIG. 6 is a waveform diagram, in which the waveform 40 represents the load current $I_{RL}$ flowing through the load RL, the waveform 42 represents the output current Io, the waveform 44 represents the voltage $V_{ADJ}$, the waveform 46 represents the reference voltage $V_{REF}1$, the waveform 48 represents the DC component Vo,avg of the output voltage Vo, the waveform 50 represents the quick response signal QR, and the waveform 52 represents the clock CLK. FIG. 7 shows the waveform 46 of the reference voltage $V_{REF}1$, the waveform 48 of the voltage Vo,avg, the waveform 50 of the quick response signal QR, and the waveform 52 of the clock CLK of FIG. 6. Referring to FIGS. 1 and 5-7, during the load transient period T, the load current $I_{RL}$ rises up quickly and the voltage Vo,avg drops quickly, as shown by the waveforms 40 and 48, respectively. The reference voltage $V_{REF}1$ decreases with the increasing output current Io. When the difference between the voltage Vo,avg and the reference voltage $V_{REF}1$ reaches the predetermined value $V_{QR}$, as shown in FIG. 7, the quick response signal QR will switch to high level, and therefore the sampling frequency of the sample and hold circuit 3040 will increase to raise the falling speed of the reference voltage $V_{REF}1$ to thereby reduce the amplitude of the ringback. Preferably, the quick response signal QR controls at least two of the comparators 3028, 3030, 3032, and 3034 to drive the corresponding channels 14. It means to turn on the high side transistor 1404 in the corresponding channel 14 to reduce the falling speed of the output voltage Vo to avoid undershoot.

Figure 8:
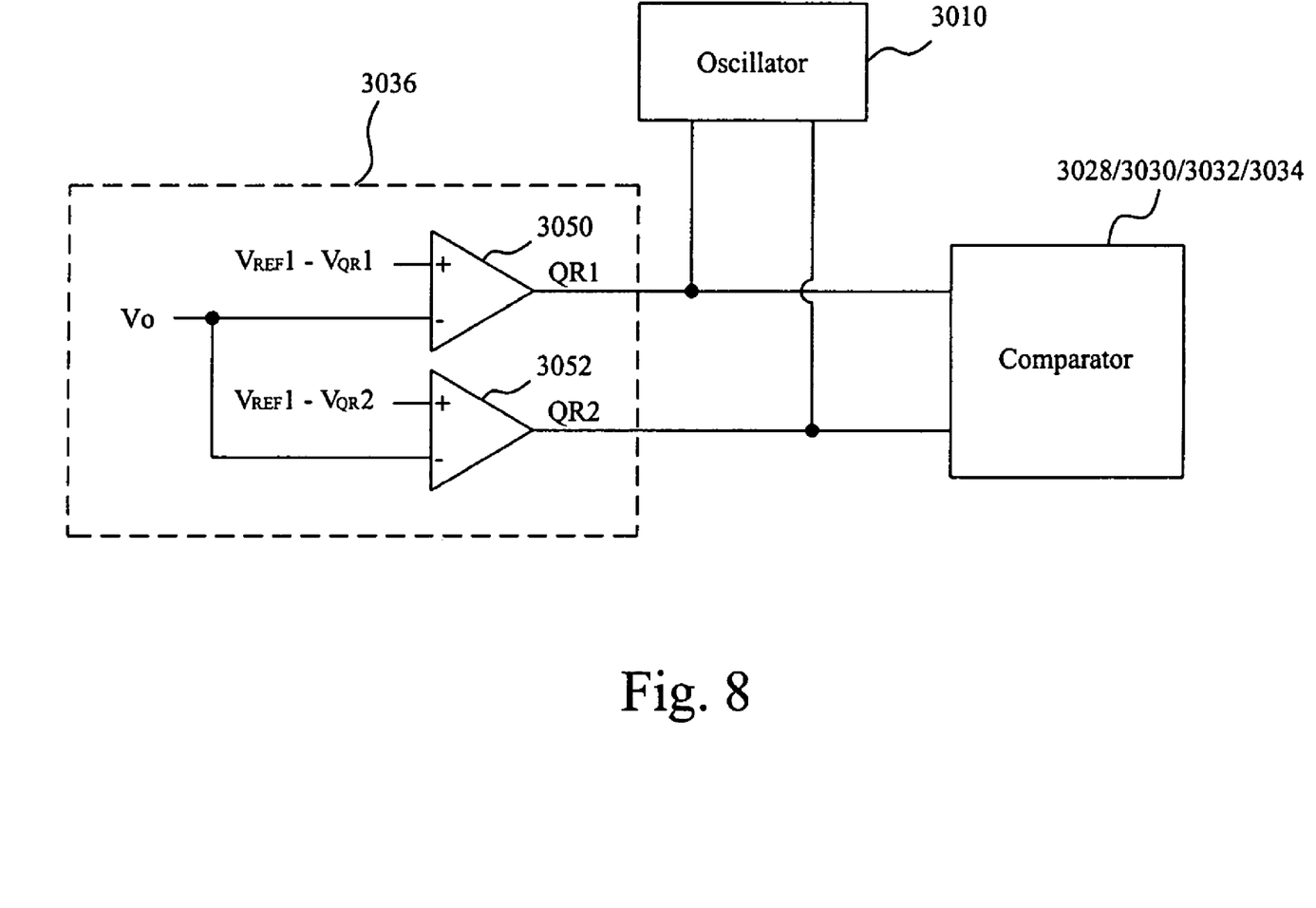
FIG. 8 shows another embodiment of the load transient detector 3036 shown in FIG. 5.

In other embodiment, the load transient detector 3036 may comprise several comparators. FIG. 8 shows one for the load transient detector 3036 of FIG. 5. It comprises two comparators 3050 and 3052. The comparator 3050 has an inverting input connected with the output voltage Vo and a non-inverting input connected with the voltage ($V_{REF}1-V_{QR}2$). The comparator 3050 compares the voltages on its inputs to generate a quick response signal QR1 for the oscillator 3010 and comparators 3028, 3030, 3032, and 3034. The comparator 3052 has an inverting input connected with the output voltage Vo and a non-inverting input connected with the voltage ($V_{REF}1-V_{QR}2$). The comparator 3052 compares the voltages on its inputs to generate a quick response signal QR2 for the oscillator 3010 and comparators 3028, 3030, 3032, and 3034. The voltages $V_{QR}1$ and $V_{QR}2$ both have predetermined values.

Figure 9:
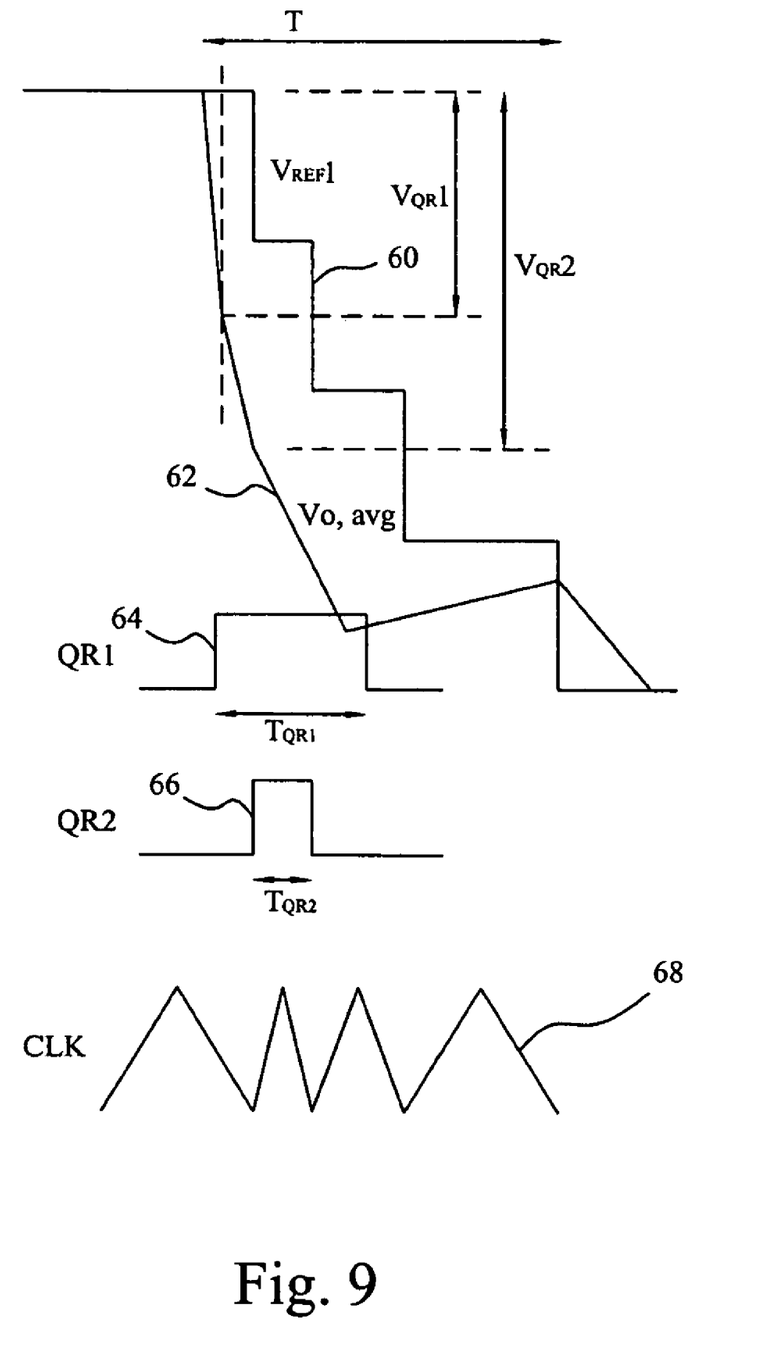
FIG. 9 is a waveform diagram of various signals during load transient when the circuit of FIG. 8 is employed.

FIG. 9 is a waveform diagram, in which the waveform 60 represents the reference voltage $V_{REF}1$, the waveform 62 represents the DC component Vo,avg of the output voltage Vo, the waveform 64 represents the quick response signal QR1, the waveform 66 represents the quick response signal QR2, the waveform 68 represents the clock CLK. Referring to FIGS. 5 and 8-9, during the load transient period T, the voltage Vo,avg drops quickly as shown by the waveform 62, and the reference voltage $V_{REF}1$ also decreases as shown by the waveform 60. The falling speed of the voltage Vo,avg is faster than that of the reference voltage $V_{REF}1$. When the difference between the voltage Vo,avg and reference voltage $V_{REF}1$ reaches the first predetermined value $V_{QR}1$ as shown in FIG. 9, the comparator 3050 will output the quick response signal QR1 with high level to increase the frequency of the clock CLK to thereby increase the falling speed of the reference voltage $V_{REF}1$. Moreover, any two of the comparators 3028, 3030, 3032, and 3034, for example the comparators 3028 and 3030, are controlled to driver the high-side transistors 1404 in the corresponding channels 14 to reduce the falling speed of the voltage Vo,avg. If the falling speed of the voltage Vo,avg is still faster than that of the reference voltage $V_{REF}1$ to result in the difference between the voltage Vo,avg and reference voltage $V_{REF}1$ to reach the second predetermine value $V_{QR}2$, the comparator 3052 will output the quick response signal QR2 with high level to increase the frequency of the clock CLk further. In addition, at least one of the remainder comparators 3032 and 3034 would be controlled to driver the high-side transistor 1404 in the corresponding channel 14 to reduce the falling speed of the output voltage Vo further.

Figure 10:
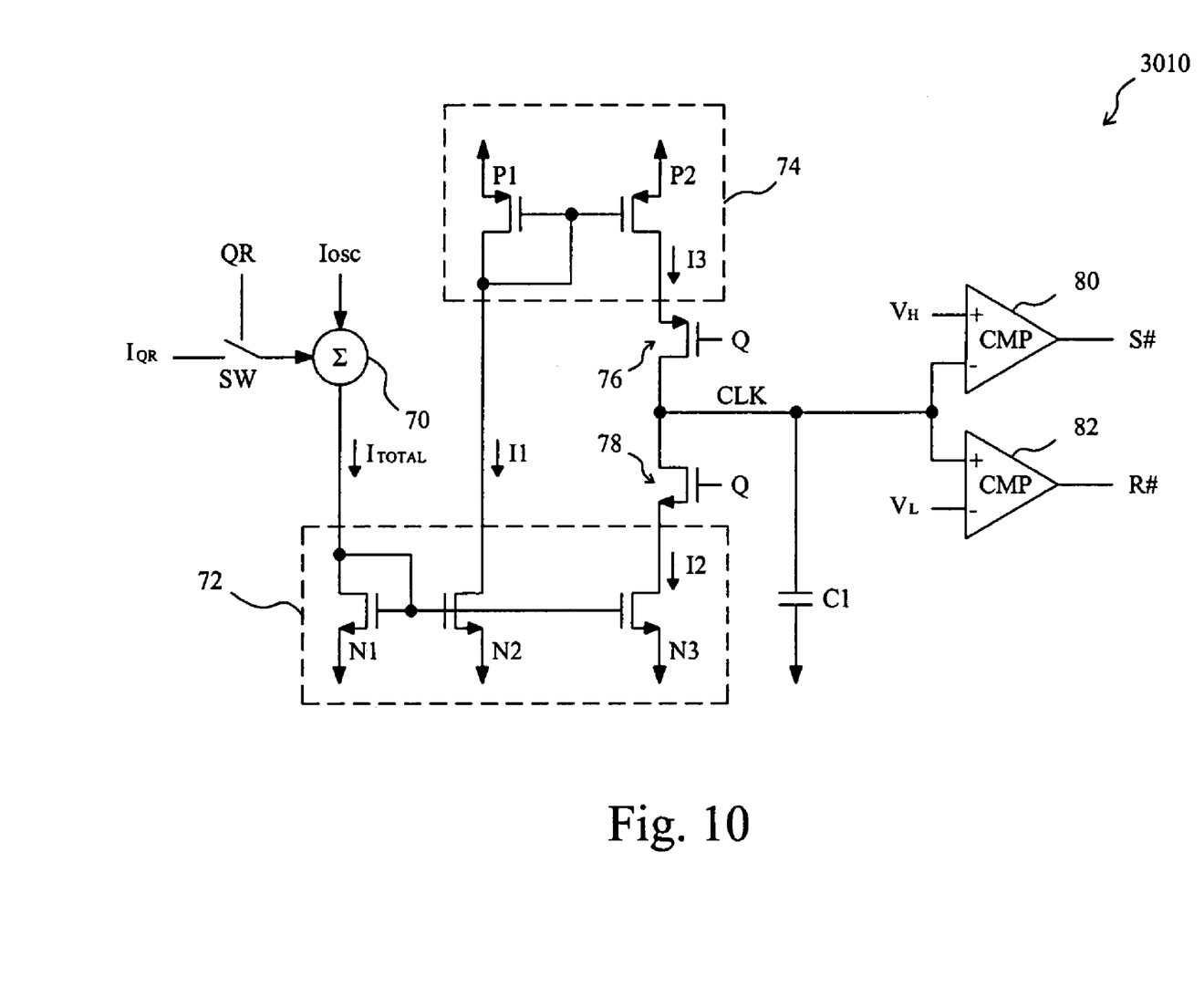
FIG. 10 shows an embodiment of the oscillator 3010 shown in FIG. 5.

FIG. 10 shows an embodiment for the oscillator 3010 of FIG. 5. An adder 70 has a first input connected with the current Iosc and a second input connected with a predetermined current $I_{QR}$ via a switch SW. The quick response signal QR switches the switch SW. The adder 70 outputs a total current $I_{TOTAL}$ in response to the currents on its inputs, and a current mirror 72 mirrors the current $I_{TOTAL}$ to generate two currents I1 and I2. A current mirror 74 mirrors the current I1 to generate a current I3. In the current mirror 72, the transistors N1, N2, and N3 have the size ratio n:1:1. In the current mirror 74, the transistors P1 and P2 have the size ratio 1:1. A PMOS transistor 76 is connected between the current I3 and a capacitor C1 and controlled by the signal Q. A NMOS transistor 78 is connected between the current I2 and capacitor C1 and controlled by the signal Q. A comparator 80 compares the clock CLK on the capacitor C1 and a reference voltage $V_H$ to generate a signal S#, and a comparator 82 compares the clock CLK and a reference voltage $V_L$ to generate a signal R#.

Figure 11:
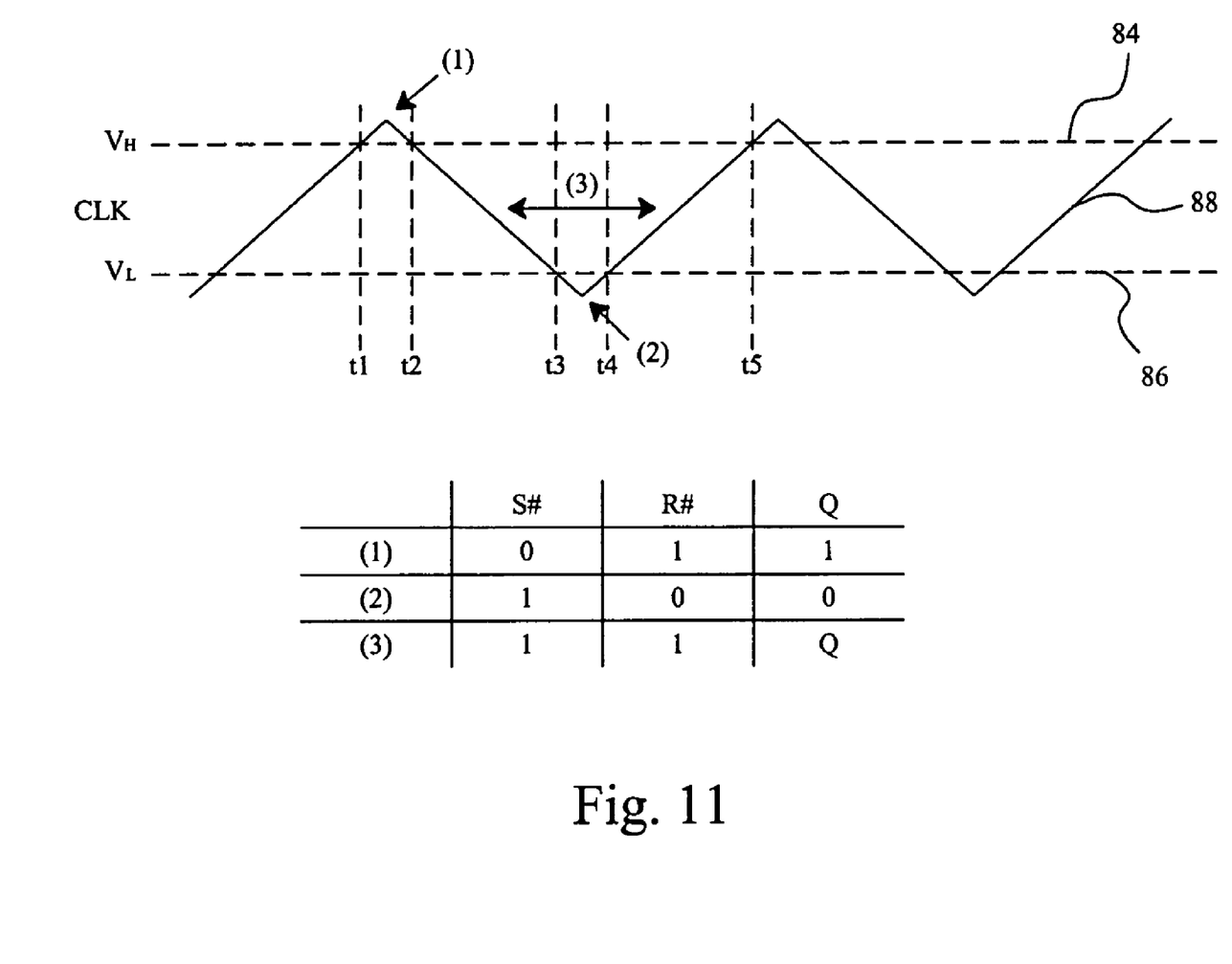
FIG. 11 shows the waveform of the clock CLK and the state table of the signals Q, S#, and R# of FIG. 10.

FIG. 11 shows the waveform of the clock CLK and the state table of the signals Q, S#, and R# shown in FIG. 10, in which the waveform 84 represents the reference voltage $V_H$, the waveform 86 represents the reference voltage $V_L$, and the waveform 88 represents the clock CLK. Referring to FIGS. 10 and 11, during time t1 to t2, the clock CLK is higher than the reference voltage $V_H$ and $V_L$, and therefore the signal S# is at low level and the signal R# is at high level, as shown by the table of FIG. 11. So the PMOS transistor 76 turns off and the NMOS transistor 78 turns on, to discharge the capacitor C1 with the current I2. During time t2 to t3, the clock CLK is lower than the reference voltage $V_H$ but higher than the reference voltage $V_L$. So the signal S# switches from low level to high level and the signal R# maintains at high level, as shown by the table of FIG. 11, and therefore the signal Q maintains the original level to last the PMOS transistor 76 off and the NMOS transistor 78 on. The capacitor C1 is continuously discharged by the current i2. During the time t3 to t4, the clock CLK is lower than the reference voltage $V_H$ and $V_L$. The signal R# switches to low level and the signal S# maintains the original level, as shown by the table of FIG. 11, and therefore the signal Q switches to low level to turn on the PMOS transistor 76 and turn off the NMOS transistor 78. The current I3 starts to charge the capacitor C1. During time t4 to t5, the clock CLK is lower than the reference voltage $V_H$ but higher than the reference voltage $V_L$. It results in the signal R# switched to high level and the signal S# maintained at the original level, as shown by the table of FIG. 11, and therefore the signal Q maintains at the original level to last the PMOS transistor 76 on and the NMOS transistor 78 off. The capacitor C1 is charged with the current I3 until the next cycle.

A cycle period including charge and discharge time is $$T \approx [n \times C1 \times (V_H - V_L)]/I_{TOTAL}. \quad \text{[EQ-1]}$$

Therefore, the frequency of the clock CLK is $$F = 1/(2T) = I_{TOTAL}/[2 \times n \times C1 \times (V_H - V_L)]. \quad \text{[EQ-2]}$$

From the equation EQ-2, it is shown that the frequency F of the clock CLK will increase when the current $I_{TOTAL}$ increases. Referring to FIGS. 5 and 10, when the load becomes heavy and the difference between the DC component Vo,avg of the output voltage Vo and the reference voltage $V_{REF}1$ reaches the predetermined value $V_{QR}$, the load transient detector 3036 will output the quick response signal QR with high level to turn on the switch SW in the oscillator 3010 to increase the current $I_{TOTAL}$ to thereby increase the frequency F of the clock CLK. In other embodiments, the number of the predetermine currents $I_{QR}$ and switches SW may be more than one and the load transient detector 3036 can provide two or more quick response signals QR.

Figure 12:
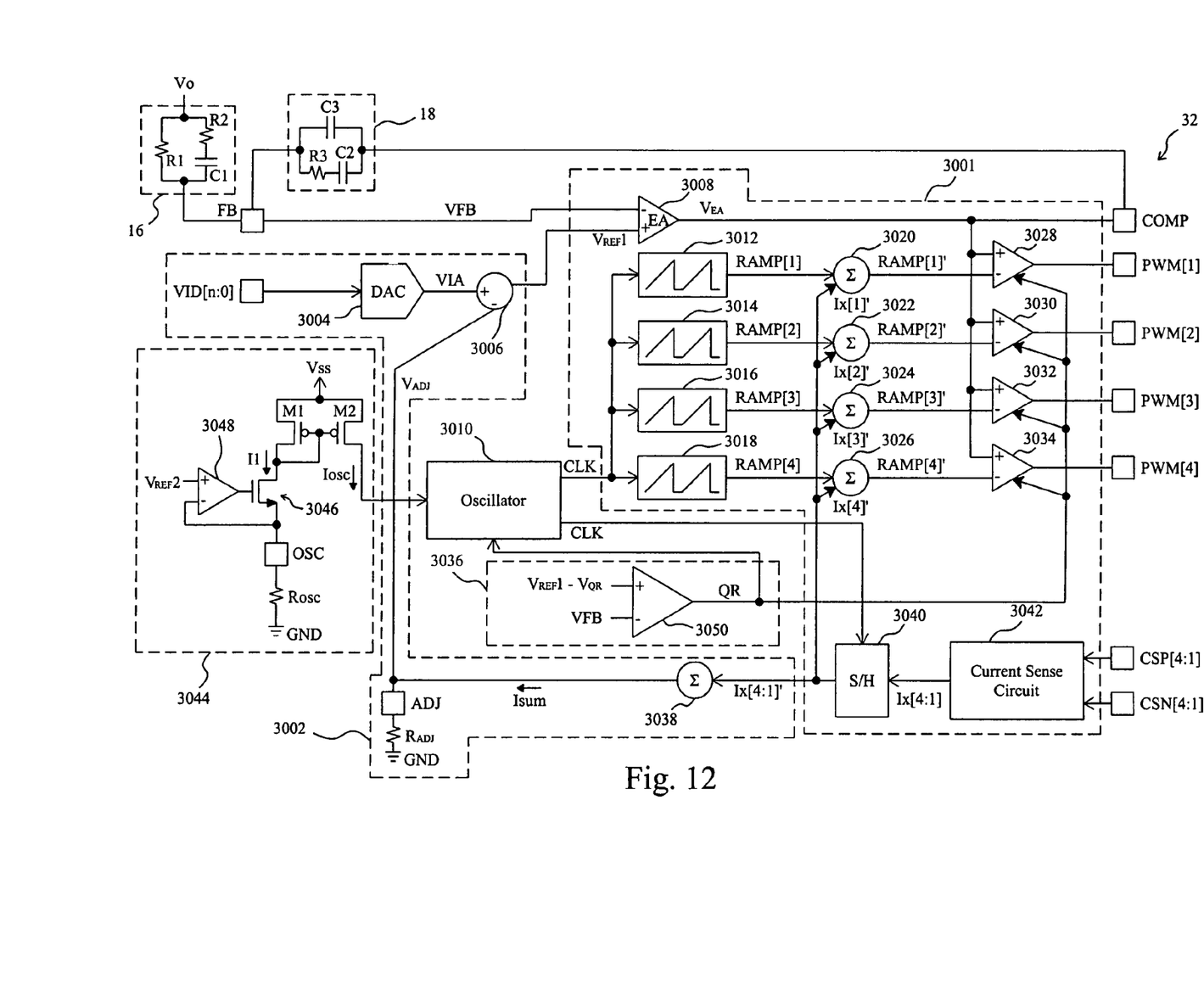
FIG. 12 shows a second embodiment of the present invention.
Figure 13:
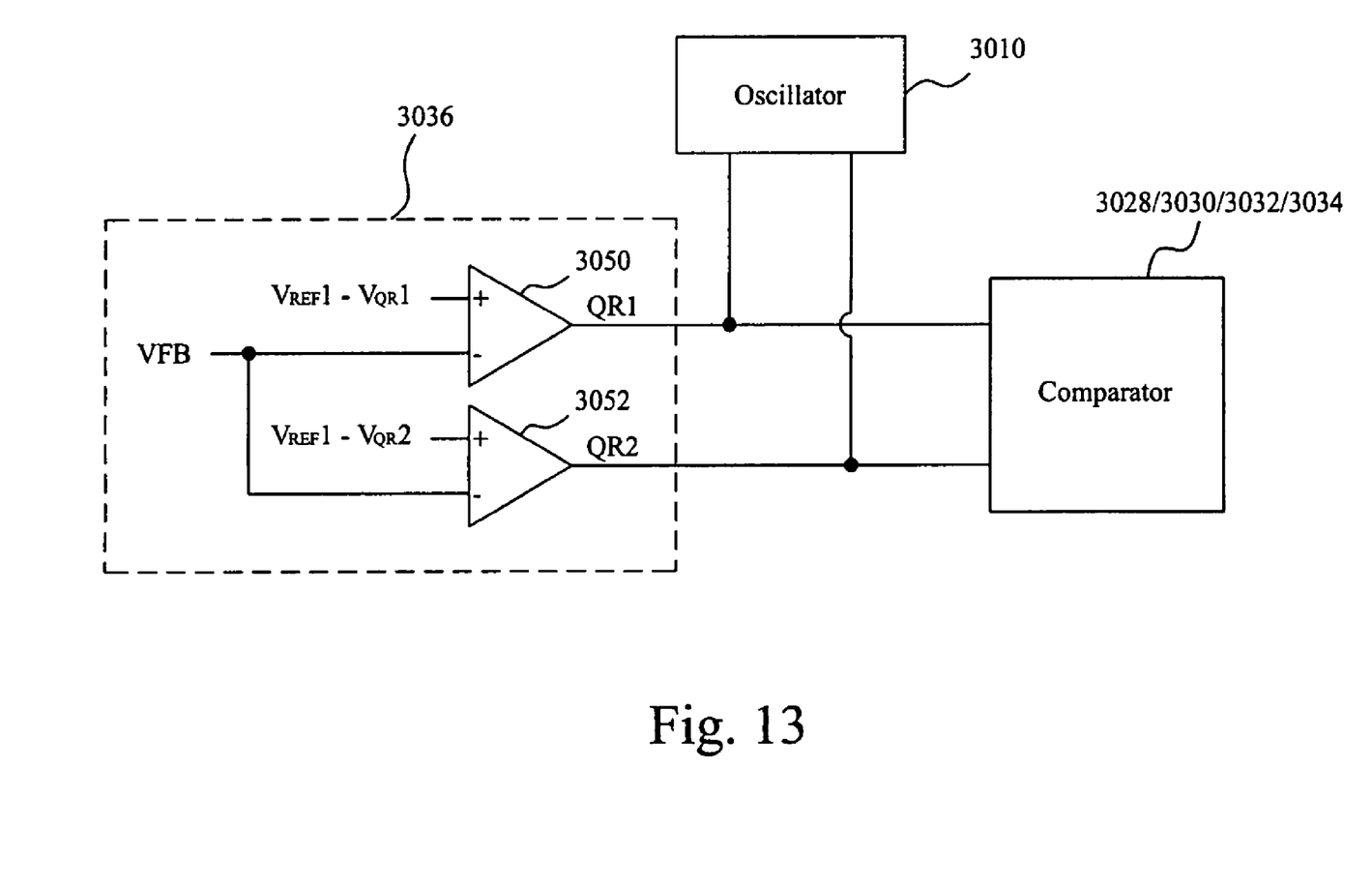
FIG. 13 shows another embodiment of load transient detector 3036 shown in FIG. 12.

FIG. 12 shows a second embodiment of the present invention. A control circuit 32 comprises a pulse width modulation circuit 3001, a voltage generator 3002, an error amplifier 3008, an oscillator 3010, a load transient detector 3036, and a current source 3044. The configuration and operation of the control circuit 32 are the same as shown in FIG. 5, except that the inverting input of the load transient detector 3036 is connected with the feedback voltage VFB instead the output voltage Vo. Likewise, the load transient detector 3036 may have more than one comparator. FIG. 13 shows another embodiment for the load transient detector 3036 of FIG. 12. It comprises two comparators 3050 and 3052, in which the inverting inputs of the comparators 3050 and 3052 both are connected with the feedback voltage VFB.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation to encompass all such modifications and similar arrangements.

What is claimed is:

1. A control circuit for a DC-to-DC converter including a plurality of channels for converting an input voltage to an output voltage, the control circuit comprising:
    an oscillator for providing a clock signal to establish an operation frequency of said converter, wherein said oscillator has output coupled to a current feedback circuit of said converter, whereby a sampling frequency of said current feedback circuit is increased responsive to said increase in frequency of said oscillator for increasing a feedback response of said converter during said quick transient response period; and
    a load transient detector having an input coupled to said output voltage to generate a quick response signal to trigger a quick transient response period in response to a load transient, said load transient detector having an output coupled to said oscillator for increasing a frequency of said clock signal during said quick transient response period responsive to said quick response signal.

2. The control circuit of claim 1, wherein said quick response signal drives at least two of said plurality of channels during said quick transient response period for turning on a high side switch of the corresponding channels responsive to said quick response signal in correspondence with said increase in frequency of said oscillator.

3. The control circuit of claim 1, wherein said load transient detector comprises a comparator for comparing a voltage proportional to said output voltage with a predetermined quick response trigger voltage to generate said quick response signal.

4. A control circuit for a DC-to-DC converter including a plurality of channels for converting an input voltage to an output voltage, the control circuit comprising:
    an oscillator for providing a clock to determine an operation frequency of said converter; and
    a load transient detector for detecting said output voltage to generate a quick response signal to trigger a quick transient response period in response to a load transient, in which period said clock oscillates more quickly,
    wherein said oscillator includes:
    first switch being turned on by said quick response signal during said quick transient response period;
    an adder having a first input connected with a first current and a second input connected with a second current via said first switch for combining the first and second currents to generate a third current;
    a first current mirror for mirroring said third current to generate a fourth current and a fifth current;
    a second current mirror for mirroring said fourth current to generate a sixth current;
    a capacitor;
    a second switch for connecting said fifth current to charge said capacitor; and
    a third switch connected between said second current mirror and said capacitor for discharging said capacitor with said sixth current;
    wherein said second and third switches alternatively switch to charge and discharge said capacitor to thereby generate said clock.

5. A control method for a DC-to-DC converter including a plurality of channels for converting an input voltage to an output voltage and a current feedback circuit, the control method comprising the steps of:
    providing a clock signal for establishing an operational frequency of said converter;
    monitoring said output voltage for detecting a load transient and triggering a quick transient response period in response to detecting said load transient;
    increasing a frequency of said clock signal during said quick transient response period;
    increasing said operational frequency of said converter during said quick transient response period; and
    increasing a sampling frequency of said current feedback circuit responsive to said increase in frequency of said clock signal for increasing a feedback response of said converter during said quick transient response period.

6. The method of claim 5, further comprising the step of driving at least two of said plurality of channels during said quick transient response period for turning on a high side switch of the corresponding channels responsive to said quick response signal in correspondence with said increase in frequency of said oscillator.

7. The method of claim 5, wherein said step of increasing an operational frequency of the converter comprises the step of increasing said operational frequency of the converter when a difference between said output voltage and a reference voltage reaches a predetermined value.

8. The method of claim 7, further comprising the step of increasing said operational frequency of the converter further when said difference reaches a second predetermined value.

* * * * *